United States Patent [19]

Tsuchida et al.

[11] Patent Number: 4,992,498

[45] Date of Patent: Feb. 12, 1991

[54] VINYL CHLORIDE-BASED RESIN COMPOSITION OF LOW MALODOR

[75] Inventors: Michinori Tsuchida, Saitama; Osamu Matsumoto, Ibaraki, both of Japan

[73] Assignee: Shin-Etsu Chemical Co., Ltd., Tokyo, Japan

[21] Appl. No.: 446,765

[22] Filed: Dec. 6, 1989

[30] Foreign Application Priority Data

Jan. 27, 1989 [JP]  Japan ................... 1-19183

[51] Int. Cl.$^5$ ............................................. C08K 5/00
[52] U.S. Cl. .................................. 524/180; 524/270; 524/567
[58] Field of Search ................ 524/180, 270, 567

[56] References Cited

U.S. PATENT DOCUMENTS 4,221,687  9/1980  Minagawa et al. ............. 524/567
4,555,541  11/1985  Reid et al. ...................... 524/180

*Primary Examiner*—Joseph L. Schofer
*Assistant Examiner*—Mark Sweet
*Attorney, Agent, or Firm*—Wenderoth, Lind & Ponack

[57] ABSTRACT

The polyvinyl chloride resin composition of the invention is highly heat-resistant as a result of compounding with an organic tin mercaptide compound as a heat stabilizer but is still free from the problem of the unpleasant odor emitted by the mercaptide compound owing to a specific deodorizing agent compounded therewith so that the composition is suitable as a molding resin composition for food containers. The above mentioned deodorizing agent is a diterpenic acid such as abietic acid or a rosin which is a crude mixture of several kinds of diterpenic acids obtained as a natural product.

4 Claims, No Drawings

VINYL CHLORIDE-BASED RESIN COMPOSITION OF LOW MALODOR

BACKGROUND OF THE INVENTION

The present invention relates to a vinyl chloride-based resin, referred to as a PVC hereinafter, composition or, more particularly, to a PVC composition capable of giving a colorless molded article emitting little offensive odor along with excellent mechanical properties, weatherability, heat stability, resistance against chemicals and transparency, especially, suitable as a molding material of containers of food.

Shaped articles of a PVC composition in general are inexpensive and have excellent mechanical properties, resistance against chemicals, weatherability, colorlessness and transparency and the flexibility or rigidity thereof can be freely controlled by compounding the PVC composition with a suitable amount of a plasticizer so that they are employed in a wide field of applications including not only household commodities but also a variety of industrial materials.

A defect in PVCs in general is that the resin is usually relatively poor in the heat resistance to cause discoloration at the temperature which the PVC composition encounters in the course of the molding process unless the PVC composition is admixed with a substantial amount of a stabilizer. Various types of stabilizers are known and under practical use in the prior art, of which metal-containing organic compounds are typical ones. When the PVC composition is used as a molding material of food containers, it is essential that the stabilizer is absolutely free from the problem of toxicity in addition to the requirement not to decrease the transparency of the articles molded from the PVC composition. Examples of stabilizers suitable for food containers are classified into three types including octyl tin mercaptide compounds, octyl tin maleates and combinations of calcium soap, zinc soap and an auxiliary agent, e.g., epoxidated soybean oil, organic phosphite compounds and the like.

These three types of stabilizers have their own advantages and disadvantages. For example, the tin mercaptide compounds exhibit excellent performance as a stabilizer in respect of the transparency, low initial coloring and heat stability of the shaped article of the PVC composition while they are not suitable for use in food containers because of the very unpleasant odor characteristic in mercaptans, although these compounds are most promixing for use in food containers if it were not for the malodor. The tin maleat compounds are free from the problem of malodor and capable of giving moderate heat stability to the PVC composition but are disadvantageous due to the relatively large initial coloring and yellowing of the shaped articles molded of the PVC composition containing the same. The metal soap-based stabilizers are defective due to the insufficient improvement in the heat stability of the PVC composition although they have no problems relative to the malodor and initial coloring of the shaped articles. Various attempts and proposals have been made to remedy the above mentioned defects in the conventional stabilizers, for example, by incorporating special substituent groups to the stabilizer compound or by the admixture of the PVC composition with a special additive but none of the attempts and proposals are far from complete solution of the problem.

SUMMARY OF THE INVENTION

The present invention accordingly has an object to provide a novel PVC composition compounded with an organic tin mercaptide compound as a stabilizer but still free from the above mentioned disadvantages caused by the use of a mercaptide compound without decreasing the inherently excellent stabilizing effect exhibited by the organic tin mercaptide compound.

Thus, the polyvinyl chloride resin-based composition of the invention comprises, as a blend:
(a) a polyvinyl chloride resin;
(b) a deodorizing agent selected from the group consisting of diterpenic acid compounds and rosins; and
(c) an organic tin mercaptide compound,
the total amount of the deodorizing agent as the component (b) and the organic tin mercaptide compound as the component (c) being in the range from 1 to 5 parts by weight per 100 parts by weight of the polyvinyl chloride resin as the component (a) and the weight ratio of the deodorizing agent as the component (b) to the organic tin mercaptide compound as the component (c) being in the range from 3:97 to 60:40.

DETAILED DESCRIPTION OF THE PREFERRED EMBODIMENTS

As is described above, the most characteristic ingredient in the inventive PVC composition is the specific deodorizing agent which is a diterpenic compound or a rosin, which is a crude mixture of diterpenic acids, obtained as a natural product. This deodorizing agent is specifically effective in deodorizing the PVC composition compounded with an organic tin mercaptide compound as a stabilizer to such an extent that the molded articles of the PVC composition is substantially free from any malodor so as to be suitable for food containers.

The polyvinyl chloride resin as the component (a) of the inventive PVC composition is not limited to homopolymeric PVC resins but can be a copolymeric PVC resin obtained by the copolymerization of a major amount of vinyl chloride monomer with a minor amount of one or more of other monomers copolymerizable with vinyl chloride exemplified by vinyl esters, e.g., vinyl acetate and vinyl propionate, acrylic and methacrylic esters, e.g., methyl acrylate, ethyl acrylate and methyl methacrylate, olefins, e.g., ethylene and propylene, maleic anhydride, acrylonitrile, styrene, vinylidene chloride and the like. The PVC resin is prepared by any known process of polymerization including suspension polymerization, emulsion polymerization, bulk polymerization, solution polymerization and the like.

The diterpenic acid used in the invention is a compound expressed by the molecular formula $C_{19}H_{29}COOH$ and the diterpenic acid compounds are exemplified by abietic acid, neoabietic acid, dihydroabietic acid, tetrahydroabietic acid, dehydroabietic acid, d-pimaric acid, iso-d-pimaric acid, levopimaric acid, podocarpic acid, agathene dicarboxylic acid and rubenic acid. The rosins as a natural product of a mixture of these diterpenic acid compounds include gum rosins, wood rosins and toll oil rosins. Abietic acid among the above named ones is preferred in view of the availability although the other compounds are equally effective. These diterpenic acid compounds and rosins can be used either singly or as a combination of two kinds or more according to need.

The diterpenic acid compounds and rosins are obtained usually in the form of sandy granules or lumps colored in light yellow or light brown and can be used as such or as finely pulverized. When any trace coloring of the PVC composition due to compounding with these colored agents should be avoided, it is recommendable to purify the diterpenic acid compounds and rosins by recrystallization from a solution in an organic solvent such as ethyl alcohol, benzene and the like to effect decolorization.

The organic tin mercaptide compounds as the component (c) act as a stabilizer in the PVC composition. The organic tin mercaptide compounds include methyl tin mercaptides, butyl tin mercaptides, octyl tin mercaptides and the like, of which octyl tin mercaptides are preferred in view of the less toxicity when the PVC composition is shaped into food containers.

The amounts of the deodorizing agent and the organic tin mercaptide compound in the inventive PVC composition should be such that the total amount of the deodorizing agent and the organic tin mercaptide compound is in the range from 1 to 5 parts by weight per 100 parts by weight of the polyvinyl chloride resin and the weight ratio of the deodorizing agent to the organic tin mercaptide compound is in the range from 3:97 to 60:40 or, preferably, in the range from 5:95 to 50:50. When the amount of the organic tin mercaptide compound is too small, the desired heat-stabilizing effect cannot be obtained as a matter of course. When the amount of the organic tin mercaptide compound is too large, on the other hand, the malodor due to the mercaptide may be emitted despite the formulation of the deodorizing agent. When the amount of the deodorizing agent is too small, the deodorizing effect can of course be exhibited not to a full extent. When the amount of the deodorizing agent is too large, on the other hand, the PVC composition may have some stickiness so that the workability in molding is greatly decreased in addition to the problem of relative decrease in the amount of the heat stabilizer. In this regard, the amount of the organic tin mercaptide compound should be at least 0.4 part by weight per 100 parts by weight of the PVC resin.

The deodorizing agent and the organic tin mercaptide compound can be compounded with the PVC resin in any suitable manner either separately or as a blend prepared beforehand since they are compatible with each other when the organic tin mercaptide compound is a liquid. When the organic tin mercaptide compound is a solid, a powdery mixture thereof with the also powdery deodorizing agent retains free-flowability without causing any troubles in handling. In addition, both of them have good compatibility with the PVC resin so that the PVC composition compounded therewith never suffers from a decrease in the transparency. Moreover, the PVC composition compounded with these materials is never imparted with stickiness so that no difficulties are encountered in the compounding works of the composition and in the molding procedure.

It is of course optional according to need that the inventive PVC composition is further compounded with various kinds of known additives conventionally compounded in PVC compositions including impact strength-improvers, lubricants, fillers, coloring agents, ultraviolet absorbers, antioxidants and the like without decreasing the heat-stabilizing and deodorizing effects.

In the following, examples and comparative examples are given to illustrate the invention in more detail but not to limit the scope of the invention in any way.

Examples and Comparative Examples

Nine PVC compositions, referred to as the composition No. 1 to No. 9 hereinbelow, were prepared each from 100 g of a polyvinyl chloride resin (TK-700, a product by Shin-Etsu chemical co.), 15 g of an MBS resin (Metablen c-202, a product of Mitsubishi Rayon co.(, 1 g of glycerin monostearate (Rikemal S-100, a product by Riken Vitamin Co.), 2 g of an organic tin mercaptide (TVS #8831, a product by Nitto Kasei Co., referred to as the mercaptide hereinbelow) and a deodorizing agent specified below first by blending in a beaker and then by milling on a 6-inch roller mill having a surface temperature of 170° C. for 5 minutes. The thus compounded PVC compositions were each shaped into a sheet having a thickness of 0.8 mm.

The deodorizing agent compounded in each of the PVC compositions No. 1 to No. 9 and the amount thereof were:

0.1 g of abietic acid as purchased in the composition No. 1;

0.2 g of abietic acid as purchased in the composition No. 2;

0.5 g of abietic acid as purchased in the composition No. 3;

1.0 g of abietic acid as purchased in the composition No. 4;

1.0 g of refined abietic acid in the composition No. 5;

0.2 g of refined abietic acid in the composition No. 6;

0.2 g of rosin in the composition No. 7;

0.5 g of rosin in the composition No. 8; and a combination of 0.1 g of abietic acid as purchased and 0.1 g of rosin in the composition No. 9.

The abietic acid used above was a light yellow product supplied by Seiken Kagaku Co. and the refined abietic acid was white and prepared by recrystallizing the above mentioned product as purchased from methyl alcohol. The rosin was supplied by Arakawa Chemical Co.

For comparison, three more PVC compositions, referred to as the compositions No. 10 to No. 12 hereinbelow, were prepared each with the same formulation as in the composition No. 1 excepting omission of the abietic acid in the composition No. 10, replacement of 2.0 g of the mercaptide with 2.0 g of octyl tin maleat (TBS #8813, a product by Nitto Kasei co., referred to as the maleat hereinbelow) and omission of the abietic acid in the composition No. 11 and replacement of 2.0 g of the mercaptide with 5 g of a calcium-zinc soap-based stabilizer, referred to as the Ca-Zn hereinbelow (a combination of 2 g of MARK SP and 3 g of ADK CIZER O-130P, each a product by Adeka Argus Kagaku Co.) and omission of the abietic acid in the composition No. 12. These comparative compositions were each shaped into a sheet of 0.8 mm thickness.

Each of the sheets prepared above was subjected to the evaluation tests for the following items by the method described below.

I. Heat stability

Test pieces of the sheet were heated in a Geer's oven at 190° c. and taken out one by one in every 15 minutes to be examined visually and rated in 10 ratings for coloration up to 90 minutes. The results are shown in Table 1 below. The ratings of point 1 to point 10 approximately correspond to the yellowness YI and color difference ΔE tabulated below.

| Rating | YI | ΔE |
| --- | --- | --- |
| 1 | 9 to 10 | 15 to 16 |
| 2 | 13 to 15 | 17 to 18 |
| 3 | 25 to 30 | 19 to 21 |
| 4 | 50 to 55 | 30 to 32 |
| 5 | 80 to 90 | 40 to 43 |
| 6 | 100 to 110 | 49 to 52 |
| 8 | 120 to 130 | 54 to 56 |
| 10 | 120 to 130 | 70 to 80 |

TABLE 1

| Composition No. | 2 | 3 | 4 | 5 | 10 | 11 | 12 |
| --- | --- | --- | --- | --- | --- | --- | --- |
| Heating time, minutes | | | | | | | |
| 0 | 1 | 1 | 2 | 1 | 1 | 2 | 1 |
| 15 | 2 | 2 | 3 | 2 | 2 | 3 | 2 |
| 30 | 3 | 3 | 4 | 3 | 3 | 6 | 8 |
| 45 | 4 | 4 | 5 | 4 | 4 | 8 | 10 |
| 60 | 5 | 6 | 7 | 5 | 5 | 10 | — |
| 75 | 8 | 8 | 9 | 8 | 8 | — | — |
| 90 | 10 | 10 | 10 | 10 | 10 | — | — |

II. Malodor

The sheet was chopped into square pieces of 3 to 4 mm a side and 10 g thereof were taken in a narrow-mouth glass bottle of 50 ml capacity together with 10 ml of pure water. The bottle hermetically sealed with a septum of Teflon-butyl rubber was heated at 80° C. for 24 hours. Thereafter, the septum was removed and the smell at the bottle mouth was smelled immediately by five panel members who were requested to evaluate the smell in 6 ratings of point 0 to point 5, point 0 corresponding to pure water and point 5 corresponding to the composition No. 10. The results are shown in Table 2.

III. Initial coloration (yellowness YI)

Measurement was made according to the method specified in JIS K 7105, 6.3. The results are shown in Table 2.

IV. Transparency (haze)

Measurement was made according to the method specified in JIS K 7105, 6.4. The results are shown in Table 2.

TABLE 2

| Composition No. | Malodor | YI | Haze |
| --- | --- | --- | --- |
| 1 | 3 | 23.2 | 3.1 |
| 2 | 3 | 27.0 | 3.1 |
| 3 | 2 | 36.9 | 3.1 |
| 4 | 1 | 53.4 | 2.9 |
| 5 | 1 | 20.8 | 3.0 |
| 6 | 1 | 21.0 | 3.0 |
| 7 | 3 | 28.5 | 3.2 |
| 8 | 1 | 27.4 | 3.6 |
| 9 | 3 | 27.1 | 3.1 |
| 10 | 5 | 19.5 | 3.2 |
| 11 | 2 | 54.7 | 5.0 |

Example 2 and Comparative Example 2

Seven PVC compositions according to the invention, referred to as the compositions No. 13 to No. 19 hereinbelow, and three comparative PVC compositions, referred to as the compositions No. 20 to No. 22 hereinbelow, were prepared each in the same manner and in the same formulation as the composition No. 1 excepting a change of the amount of the mercaptide or replacement of the mercaptide with or additional addition of another stabilizer shown in Table 3 below and change of the amount or omission of the abietic acid as purchased or replacement with or additional addition of another deodorizing agent as shown in the same table. The amount of the additives in Table 3 is given in g.

TABLE 3

| Composition No. | 13 | 14 | 15 | 16 | 17 | 18 | 19 | 20 | 21 | 22 |
| --- | --- | --- | --- | --- | --- | --- | --- | --- | --- | --- |
| Mercaptide | 1.9 | 1.8 | 2.1 | 0.8 | 2.1 | 2.1 | 2.1 | 2.0 | — | — |
| Maleate | — | — | — | 1.0 | — | — | — | — | 2.0 | — |
| Ca—Zn | — | — | — | — | — | — | — | — | — | 5.0 |
| Abietic acid | 0.1 | 0.2 | 0.9 | 0.2 | — | — | 0.45 | — | — | — |
| Refined abietic acid | — | — | — | — | — | 0.9 | — | — | — | — |
| Rosin | — | — | — | — | 0.9 | — | 0.45 | — | — | — |

These PVC compositions were each shaped into a sheet and subjected to the evaluation tests in the same manner as in the preceding examples. The results of the heat stability test are shown in Table 4 below and the results of the other tests are shown in Table 5 below.

TABLE 4

| Composition No. | 14 | 15 | 16 | 18 | 20 | 21 | 22 |
| --- | --- | --- | --- | --- | --- | --- | --- |
| Heating time, minutes | | | | | | | |
| 0 | 1 | 2 | 1 | 1 | 1 | 2 | 1 |
| 15 | 2 | 3 | 2 | 2 | 2 | 4 | 2 |
| 30 | 3 | 4 | 5 | 3 | 3 | 6 | 8 |
| 45 | 4 | 5 | 5 | 4 | 4 | 8 | 10 |
| 60 | 6 | 7 | 8 | 5 | 5 | 10 | — |
| 75 | 8 | 9 | 10 | 8 | 8 | — | — |
| 90 | 10 | 10 | — | 10 | 10 | — | — |

TABLE 5

| Composition No. | Malodor | YI | Haze |
| --- | --- | --- | --- |
| 13 | 3 | 22.8 | 3.0 |
| 14 | 3 | 26.8 | 3.1 |
| 15 | 2 | 51.3 | 2.9 |
| 16 | 1 | 28.7 | 3.8 |
| 17 | 2 | 53.1 | 3.5 |
| 18 | 1 | 20.1 | 3.0 |
| 19 | 1 | 50.6 | 3.2 |
| 20 | 5 | 19.5 | 3.2 |
| 21 | 2 | 54.7 | 5.0 |

What is claimed is:
1. A polyvinyl chloride resin-based composition which comprises, as a blend:
 (a) a polyvinyl chloride resin;
 (b) a deodorizing agent selected from the group consisting of diterpenic acids compounds and rosins; and
 (c) organic tin mercaptide compound,
the total amount of the deodorizing agent as the component (b) and the organic tin mercaptide compound as the component (c) being in the range from 1 to 5 parts by weight per 100 parts by weight of the polyvinyl chloride resin as the component (a) and the weight ratio of the deodorizing agent as the component (b) to the organic tin mercaptide compound as the component (c) being in the range from 3:97 to 60:40.

2. The polyvinyl chloride resin-based composition as claimed in claim 1 wherein the diterpenic acid is abietic acid.

3. The polyvinyl chloride resin-based composition as claimed in claim 1 wherein the weight ratio of the deodorizing agent as the component (b) to the organic tin mercaptide compound as the component (c) is in the range from 5:95 to 50:50.

4. The polyvinyl chloride resin-based composition as claimed in claim 1 wherein the organic tin mercaptide compound is octyl tin mercaptide.

* * * * *